United States Patent
Prasad et al.

(10) Patent No.: US 7,900,010 B2
(45) Date of Patent: Mar. 1, 2011

(54) SYSTEM AND METHOD FOR MEMORY ALLOCATION MANAGEMENT

(75) Inventors: Vikas K. Prasad, Bangalore (IN); Sudheer Kumar Vootla, Bangalore (IN)

(73) Assignee: Ittiam Systems (P) Ltd., Bangalore, Karnataka (IN)

( * ) Notice: Subject to any disclaimer, the term of this patent is extended or adjusted under 35 U.S.C. 154(b) by 601 days.

(21) Appl. No.: 11/774,620

(22) Filed: Jul. 9, 2007

(65) Prior Publication Data

US 2009/0019097 A1    Jan. 15, 2009

(51) Int. Cl.
*G06F 13/00* (2006.01)
*G06F 13/28* (2006.01)
*G11C 7/00* (2006.01)
*G11C 8/00* (2006.01)

(52) U.S. Cl. .................. 711/170; 711/5; 711/E12.002; 365/189.2; 365/230.01

(58) Field of Classification Search ............ 711/5, 711/170, E12.002; 365/189.2
See application file for complete search history.

(56) References Cited

U.S. PATENT DOCUMENTS

| | | | | |
|---|---|---|---|---|
| 5,860,083 | A * | 1/1999 | Sukegawa .................. 711/103 |
| 6,643,754 | B1 * | 11/2003 | Challenger et al. .......... 711/171 |
| 2005/0235124 | A1 * | 10/2005 | Pomaranski et al. ........ 711/170 |
| 2007/0033367 | A1 * | 2/2007 | Sakarda et al. .............. 711/170 |

* cited by examiner

*Primary Examiner*—Matt Kim
*Assistant Examiner*—Edward J Dudek, Jr.
(74) *Attorney, Agent, or Firm*—Prakash Nama; Global IP Services, PLLC

(57) ABSTRACT

A memory manager for a system, a system that includes the memory manager and a method of using thereof are provided. The memory manager manages memory allocations in at least a memory. The memory manger comprises, a first unit configured for receiving a plurality of requests from one or more components of one or more applications of a system. The memory manager also includes a second unit configured for optimizing memory allocations for the plurality of requests.

20 Claims, 3 Drawing Sheets

SYSTEM AND METHOD FOR MEMORY ALLOCATION MANAGEMENT

FIELD OF THE SUBJECT MATTER

The present subject matter relates to a system and a method for memory allocation management.

BACKGROUND

New generation information systems run a number of applications concurrently. The requirement of resources in the information system increases according to the complexity of the applications and/or the number of applications supported by the information system. Following the desire to keep the cost low, many applications may be required to share the same resources of the information system. Memory is one amongst the resources that are commonly shared by the applications. Similar to other expensive resources, inclusion of more memory capacity in the information system may be strictly controlled by its cost. The cost of the memory increases with its speed of operation. That means an information system may include limited size of high speed memory. On the other hand, the applications running on the information system may desire to execute most of its functions using high speed memory, which may result in multiple applications competing for the limited high speed memory. Particularly, in embedded multimedia applications, the efficient use of the memory determines the performance of the information system.

While allocating memory, the information system generally considers a request for a memory allocation from an application. The need to attend to this request may be time consuming, thus, employing this method for memory allocation may not provide an optimal solution. Furthermore, the systems often end up spending time and resources in managing memory allocations which may be an additional burden on the information system and may degrade its' performance.

BRIEF DESCRIPTION OF DRAWINGS

Embodiments of the invention will now be described, by way of example only, with reference to the accompanying drawings in which.

DETAIL DESCRIPTION OF DRAWINGS

In the following detailed description of various embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

Figure 1:
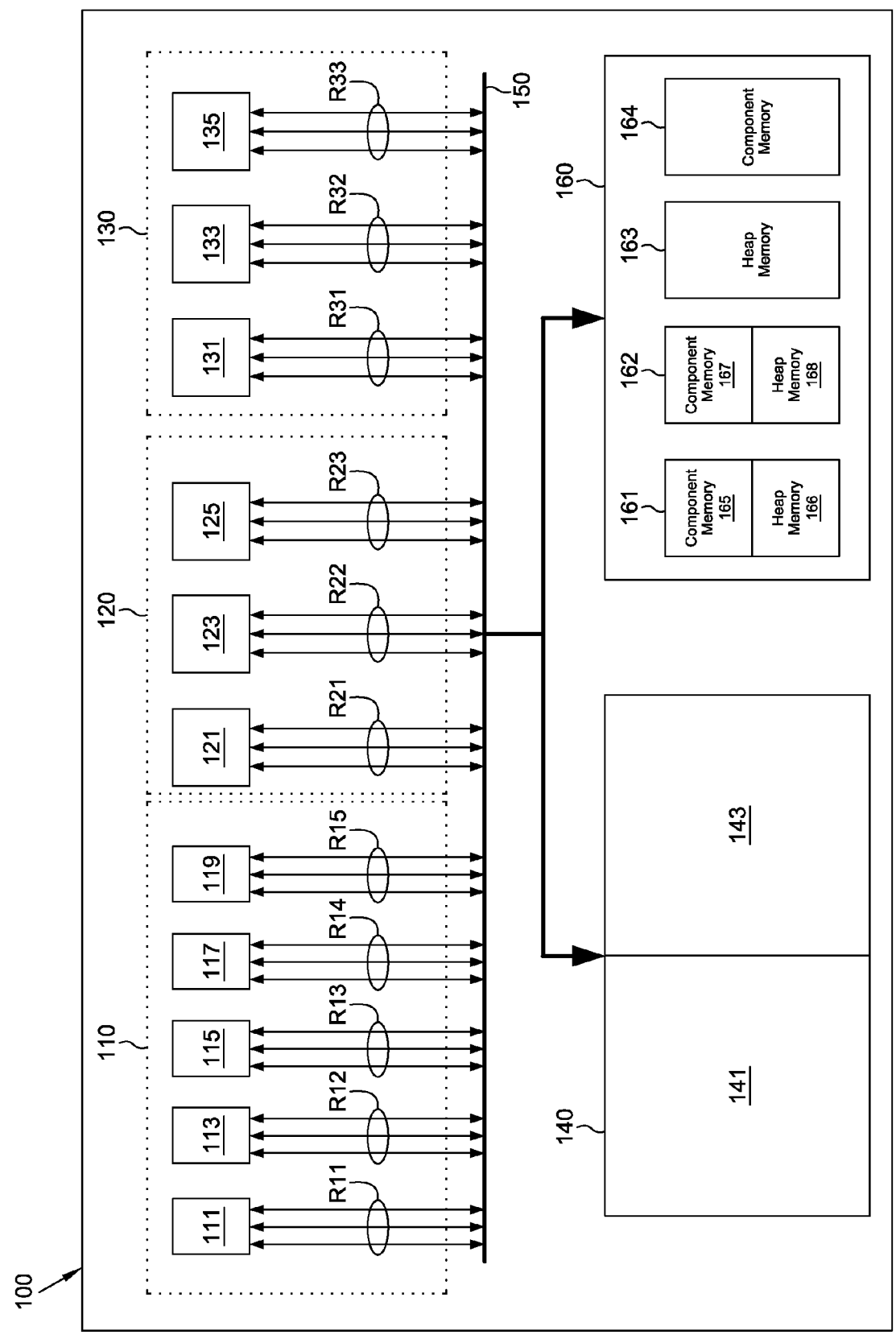
FIG. 1 shows an embodiment of a system in accordance with the present subject matter.

FIG. 1 shows an embodiment of a system 100 in accordance with the present subject matter. The system 100 may include a plurality of resources such as, processing unit, registers, buses, buffers, one or more memories 160, different logic blocks etc. The memory 160 may include a number of auxiliary memories 161, 162, 163, and 164. The auxiliary memories 161, 162, 163, and 164 may be Internal Random Access Memory (IRAM), Synchronous Dynamic Random Access Memory (SDRAM) and other memories. Each of the auxiliary memories 161, 162, 163, and 164 may be identified as a dedicated memory for a specific application. According to another embodiment, each of the auxiliary memories 161, 162, 163, and 164 may be identified by its operating speed. According to another embodiment, each of the auxiliary memories 161, 162, 163, and 164 may be identified by both its operating speed and as a dedicated memory for a specific application that is implemented using the auxiliary memory.

Identification of each of the auxiliary memories 161, 162, 163, and 164 as dedicated memories for specific applications may be better understood by way of an example of an IP video phone application. A system, that implements the IP video phone application, requires running a number of applications and components concurrently. Some of the applications in the IP video phone may deal with speech codec and some other applications may deal with video codec. According to one embodiment, an auxiliary memory may be identified as a speech codec memory and another may be identified as a video codec memory. The speech codec memories may be used for hosting those applications which deal with speech codec. Similarly, the video codec memory may be used for implementing those applications which deal with video codec. This allows the applications to use dedicated auxiliary memories without disturbing other auxiliary memories. According to another embodiment, the auxiliary memories may further be used according to a criterion specific to the applications. One such criterion is frequency of requirement of memory allocations for an application. According to this criterion, an auxiliary memory may be dedicated for applications that run throughout the system run time and require memory allocation more frequently and other auxiliary memories may be dedicated for the applications that may not run throughout the system run time and invoke memory allocation request only when needed. Similarly, other criterion may be used for dedicating the auxiliary memories 161, 162, 163, and 164.

Further, each of the auxiliary memories 161, 162, 163, and 164 may include a component memory 165, 167, and 164 and/or a heap memory 166, 168 and 163. In the component memory 164, 165 and 167 there may exist a scratch memory and/or persistent memory. The scratch memory is a smart memory and a component or an application that is storing data in the scratch memory may include intelligence for utilizing the scratch memory, so as to remove the contents of the scratch memory as soon as the application or the component does not require the stored data. Whereas the persistence memory may be a memory having storage space and an application or a component may not have intelligence to remove the contents of the memory. The component memory 164, 165 and 167 are memories that may be used for one or more requests for memory allocation from one or more applications. Unlike the component memory 165, 167, and 164, the heap memory 166, 168 and 163 may include persistent memory and is generally used for individual requests for allocating memory from an application. The application may consists of a number of software cods or components and one or more of these components may need to occupy either the component memory or persistent memory depending on the memory requirement of the application.

The system 100 may be configured for running one or more applications 110, 120, 130 etc. The resources of the system 100 may be shared by, or dedicated for, one or more applications 110, 120 and 130. The applications 110, 120, 130 may be a software code or it may be hard coded logic or any combination thereof. In an example, an application may be an Internet Protocol (IP) video phone, or a streaming server, set-top box, personal media player/recorder and the like or any combination thereof.

The applications 110, 120, 130 may include one or more components, 111, 113, 115, 117, 119, 121, 123, 125, 131, 133, and 135. The components 111, 113, 115, 117, 119, 121, 123, 125, 131, 133, and 135 of an application 110, 120, 130 may be coupled to one another by an application framework. The application framework may be a logic coupling components 111, 113, 115, 117, 119, 121, 123, 125, 131, 133, and 135 to one another to form one or more applications. Further, the applications 110, 120, and 130 may be coupled to one another by a system framework. The system framework may be a logic coupling applications 110, 120 and 130 within the system 100. The applications 110, 120 and 130 may share one or more resources, such as bus, registers, and logic blocks, memory 160, etc. of the system 100. The applications 110, 120 and 130 may also share one or more components 111, 113, 115, 117, 119, 121, 123, 125, 131, 133, and 135. Each of the components 111, 113, 115, 117, 119, 121, 123, 125, 131, 133, and 135 may be configured for providing one or more requests R11, R12, R13, R14, R15, R21, R22, R23, R31, R32 and R33 for memory allocations. These requests R11, R12, R13, R14, R15, R21, R22, R23, R31, R32 and R33 may be provided to a memory manager 140. The memory manager 140 may include a first unit 141. The first unit 141 may be configured for receiving one or more the requests R11, R12, R13, R14, R15, R21, R22, R23, R31, R32 and R33. The memory manager 140 may include a second unit 143. The second unit 143 may be customized for serving specific requests of the memory allocations. The second unit 143 may be configured for optimizing configuration of memory allocations. The second unit 143 may optimize the configuration of memory allocations according to the received requests and corresponding parameters. The second unit 143 is also configured for generating a memory map. The memory map may be indicative of configuration of memory allocations. The request R11, R12, R13, R14, R15, R21, R22, R23, R31, R32 and R33 might be supplied via any means 150, such as a software function call, hard coded supply line/data bus, wireless communication or other communication means.

In an example, the application 110 may be an IP video phone. The application 110 may include components such as H.264 decoder 111, H.264 encoder 117, G.711 speech codec 113, MPEG4 coder/decoder 119 and Advance Audio Codec (AAC) 115. Each of the components 111, 117, 113, 119 and 115 may be configured for providing one of more requests R11, R12, R13, R14 and R15 for memory allocations.

Each of the requests R11, R12, R13, R14, R15, R21, R22, R23, R31, R32 and R33 may include one or more parameters. The parameters may be indicative of details of the request. For example, a request may include a first parameter for indicating requested auxiliary memory. It may also include a second parameter for indicating priority of the request. It may further include a third parameter for indicating requested memory alignment. The request may also include a fourth parameter for indicating requested memory size. It may also include a fifth parameter for indicating mandatory status of the request. The mandatory status of the request indicates weather it is mandatory to allocate memory for the request. The request may include a parameter for identifying component and/or application from where the request is generated. The request may also include a parameter for indicating that the request is for the scratch memory or the persistent memory. In an embodiment, a group of requests may include parameters to identify the components and/or the applications from which the requests are generated. According to a further embodiment, the one or more parameters may include indicators for indicating association of a component with a group of the components. According to another embodiment, the one or more parameters may include indicators for indicating association of a request of a component with a group of the components.

The one or more parameters may be understood by the example of the system implementing the IP video phone. In the IP video phone, the component H.264 encoder 111 may provide a request R11 that may include the parameter for indicating auxiliary memory required by its speed, e.g. high speed. The request may further include a parameter for indicating that the request is for a scratch memory by indicating "S" or that the request is for a persistent memory by indicating "P". The request may also include, a parameter for indicating priority of the request (as "high" or) or a range of priority ranging from high to low. It may further include a parameter for indicating alignment of the memory requested as "don't care" or may provide required alignment requirements. The request may also include a parameter for indicating requested memory size as "16384 bytes". The request may further include a parameter for indicating mandatory status of the request as "true" or "false". In an embodiment, a group of requests may include parameters to identify the components and/or the applications from which the requests are generated. According to a further embodiment, the one or more parameters may include indicators for indicating association of a component or a request of a component to a group of components.

According to one example, for a given memory the optimization of memory allocation may be performed by the memory manager 140 by examining the parameters of the requests. During the examination, size of memory required by the requests that have mandatory status "true" may be determined. This may provide an estimate of the minimum memory required by the request having mandatory status "true". Once this estimation is obtained, an estimate of the size of the memory required by the requests having high priority may be obtained. Subject to further availability of memory space, an estimate may be obtained for the remaining requests according to criteria for serving maximum number of requests in the available memory or according to criteria for utilizing the maximum available memory. After having determined the possible requests that may be served, the allocation of memory may be performed considering the parameter indicating alignment requirements.

Further, while performing optimization, possibly of the overlaying of the memory allocation requests_may be considered. The applications 110, 120 and 130 may provide the memory manager 140 information relating to the memory allocation that are required by components 111, 113, 115, 117, 119, 121, 123, 125, 131, 133, and 135 that may not be executing simultaneously or substantially simultaneously. A group made up of components 111, 113, 115, 117, 119, 121, 123, 125, 131, 133, and 135 may be formed by identifying the components. The one or more parameters may include a parameter for indicating the requests belonging to the components 111, 113, 115, 117, 119, 121, 123, 125, 131, 133, and 135 that make up the group. According to the information of the group, overlaying of memory allocation from one or more of the components may be determined and factored in accordingly.

Overlaying of memory allocation may be further understood by the following example. Consider two auxiliary memories, a faster auxiliary memory, say 161 of size 100 bytes and a slower auxiliary memory 162 of size 200 bytes. Also consider two components 125 and 135 (belonging to a group), both requiring 50 bytes of scratch memory and 50 bytes of persistent memory each in the auxiliary memory 161. Requests from both components 125 and 135 are accommodated in the auxiliary memory 161 by overlaying the scratch and persistent memories of both components 125 and 135. Subject to the fact that the components 125 and 135 may not be executing simultaneously or substantially simultaneously. In such case, when the component 125 is in operation, the auxiliary memory 161 may be used by the component 125. Whereas, when the component 135 is in operation, the content of the auxiliary memory 161 memory may be cached (or removed) and the auxiliary memory 161 may be freed for allocating requests from component 135. Now, consider that another component 115 requests memory allocation in the auxiliary memory 161 but has lower priority and belonging to a different group, then the memory allocation for the request made by the component 115 may be allocated a memory location in the auxiliary memory 162 instead of the auxiliary memory 161.

The above explained overlaying of memory allocation provides an efficient performance and optimal usage of the memory. Overlaying of memory requests may invoke back up of some or all the contents of the memory locations that are used for overlaying a number of requests. Further, overlaying may also involve restoring the contents of the memory that was cached. To avoid backup and restoring of memory contents during optimization and if it is determined that enough memory space is available then overlaying of request may not be implemented. Overlaying of memory is advantageous in a situation when the components 111, 113, 115, 117, 119, 121, 123, 125, 131, 133, and 135 for which overlaying of memory is done are not executing simultaneously or substantially simultaneously. The memory manager 140 may not backup the memory contents of the scratch memory, while only persistent memory that are overlaid may be backed up.

In the above example, a memory map may be generated by the memory manager 140. The memory map may be supplied to respective applications 110, 120 and 130. The applications 110, 120 and 130 are configured for obtaining the memory map from the memory manager 140. The applications 110, 120 and 130 may also be configured for opting selectively for allocating memory according to the memory map. The applications 110, 120 and 130 may be configured for obtaining and opting selectively by a software call back function. The call back function may be implemented in the applications 110, 120 and 130 by means of a software code. The applications 110, 120 and 130 within the same call back function may accept the memory map and allow the allocation of the memory according to the memory map or it may also reject the memory map and opt for not allocating memory according to the memory map.

Once the memory manager 140 receives an indication that the memory map has been accepted by the applications 110, 120 and 130, the memory manager 140 allocates memory and performs required movement of the content of the memory 160. When the applications 110, 120 and 130 reject the memory map, no allocations or movement of content of memory 160 is performed.

The memory manager 140 may receive acceptance for the memory map generated for the requests R11, R12, R13, R14, R15, R21, R22, R23, R31, R32 and R33 from one or more components 111, 113, 115, 117, 119, 121, 123, 125, 131, 133, and 135 of one or more applications 110, 120 and 130. The acceptance may be received by the memory manager 140 for partial memory map for a set of requests originating from of a component or applications 110, 120 and 130 or any combination thereof. Configuring applications 110, 120 and 130 for selectively opting for allocating memory allows options for allocating memory according to partial or complete memory map or rejecting the memory map totally and allows running of the applications 110, 120 and 130 according to any memory map that may have been generated for any earlier request(s).

The above explained features may be further understood in the light of the example of the IP video phone. Consider a situation wherein a video call is in progress on the IP video phone. This call may be an application. Suppose that this video call uses a component which is basically a codec H.264. While the video call is in progress suppose a second video call is invoked. The second video call is a second application. Suppose that the second application uses a component which is basically a coded MPEG4. The coded MPEG4 negotiates with the memory manager 140 for memory allocations. Considering the request of the codec MPEG4 of the second application and already existing allocations of the coded H.264, the memory manager 140 provides a memory map to both the applications. Assume that the memory map is not acceptable by any of the applications. In such case, the second application or the first application or both, may alter the request for allocating memory. In an example, the second application may select to run only speech portion of the call and invoke a component, which is basically a codec G.711. The codec G.711 may then provide a new set of requests for memory allocations to the memory manager 140. Since, the coded G.711 runs only speech portion of the second application, it is likely that the memory required by the requests generated by the codec G.711 may lead to a memory map that may be acceptable to the both applications. In another embodiment, the first or the second or both the applications may alter the parameters of their respective requests in the situation where a memory map is not acceptable by one or both the applications. Alternatively, the system that is running the IP video phone may consider dropping the second application.

Further, consider an example where the codec H.264 is running in an application and a new application invokes for the codec G.711 which generates one or more requests for memory allocations. The memory manager 140 then may provide a memory map according to a request. Suppose the request generated by the codec G.711 is allocated at a memory location that is different from the requested location (for example, a slower memory is allocated). The memory map provided by the memory manager 140 may still be acceptable to the new application or the codec G.711 that has generated the request, if it is possible to run the G.711 codec without substantially affecting the performance or degradation of the running application.

The memory manager 140 may further be configured for receiving a first memory architecture from one or more applications 110, 120 and 130 and for optimizing configuration of memory allocations according to the received requests, corresponding parameters and a first memory architecture. The first memory architecture includes information of a layout of the memory. The layout of the memory is explained with reference to an example and at later part of the description. Configuration of the memory manager 140 may be done by supplying details of the memory 160. The details may include specifics regarding sizes and starting addresses of the memories 161, 162, 163 and 164. The first memory architecture may retain details of the heap memory and the component memory in the memories 161, 162, 163 and 164.

According to one embodiment, optimization may follow substantially the same steps and features as described earlier, with additional variables for the first memory architecture. Additional variable may provide information that may be used to avoiding multiple copying of the contents in the memory 160. The additional variables may also allow overlaying of requests in the scratch memory. For example, according to the optimized memory map, it offers a memory efficient solution which overlays plurality of requests on one another, however, after accommodating the requests, if there still exists any unused part of the memory then the memory map may be revised for removing the overlaying and utilize the unused part of the memory for the requests that have been overlaid.

According to another embodiment, the additional variables may be provided to identify re-locatable and non-re-locatable memory requests. For example, after allocating a memory space for a request, the allocation may be identified as re-locatable or non-re-locatable request. This means that the allocated memory space for a non-re-locatable request would be reserved for that particular request. For further requests, the optimization may be carried out for the memory excluding the part of the memory occupied by the non-re-locatable memory. The memory occupied by the non-re-locatable requests may be excluded from any further optimization process irrespective of the parameters such as, parameter indicating mandatory status or parameter indicating priority status.

The re-locatable and non-re-locatable memory allocation request may be understood by the following example. Consider a component 111 that requires a few hardware buffers (used by a particular hardware in the system) in a particular memory type which needs to be allocated only in a particular type of memory. The memory manager 140 may allocate a memory space for request and identify the allocated memory space as non re-allocated locatable. Subsequently, if a new component 113 is added with a higher priority, the memory space is not disturbed.

Further the present subject matter provides options for changing the first memory architecture with a second memory architecture. The second memory architecture may include information of a layout of the memory 160. The layout of the memory 160 of the second memory architecture may be different than the layout of the memory 160 of the first memory architecture. According to this embodiment, the applications 110, 120 and 130 or the components 111, 113, 115, 117, 119, 121, 123, 125, 131, 133 and 135 may be stopped from being executed and the second memory architecture may be provided to the memory manager 140. The memory manager 140 may map the second memory architecture on the memory 160 and optimally map the contents allocated in accordance to the first memory architecture onto the second memory architecture. The memory manager 140 may also optimize the existing request according to the second memory architecture. In an example, the second memory architecture may include in addition to the first memory architecture a memory location that is a part of a code memory that may be available for re-use. The code memory is the memory where a software code may reside. The code memory may be added as another auxiliary memory. This enables plurality of options, including the option of overlaying requests over the code memory. The code memory may later be reclaimed after re-initializing back to the first memory architecture.

In an embodiment, the memory 160 according to the first memory architecture may include information of a layout of the memory. In one example of the first memory architecture the memory 160 may include auxiliary memories IRAM and external RAM. In this example, assume that both the auxiliary memories have length 1000 bits. Starting address of the IRAM is 0000 and ending address is 0999. Starting address of the external RAM is 1000 and the ending address is 2000. The second memory architecture may include two IRAMs say, IRAM1 and IRAM2 of length 500 bits each. In this case, the memory 160 may be configured to implement the second architecture by logically dividing the IRAM into two parts. A first part IRAM1 having starting address from 0000 and ending address 0499 and a second part IRAM2 having starting from address 0500 and ending address 1000. The allocations that are made on the IRAM according to the first architecture may be optimally mapped on the second architecture. In case, where the IRAM as observed by the first architecture is having allocations only for addresses ranging between 0000 and 0499 then, the second architecture may include all allocations of the first architecture without disturbing the content in the IRAM1.

Figure 2:
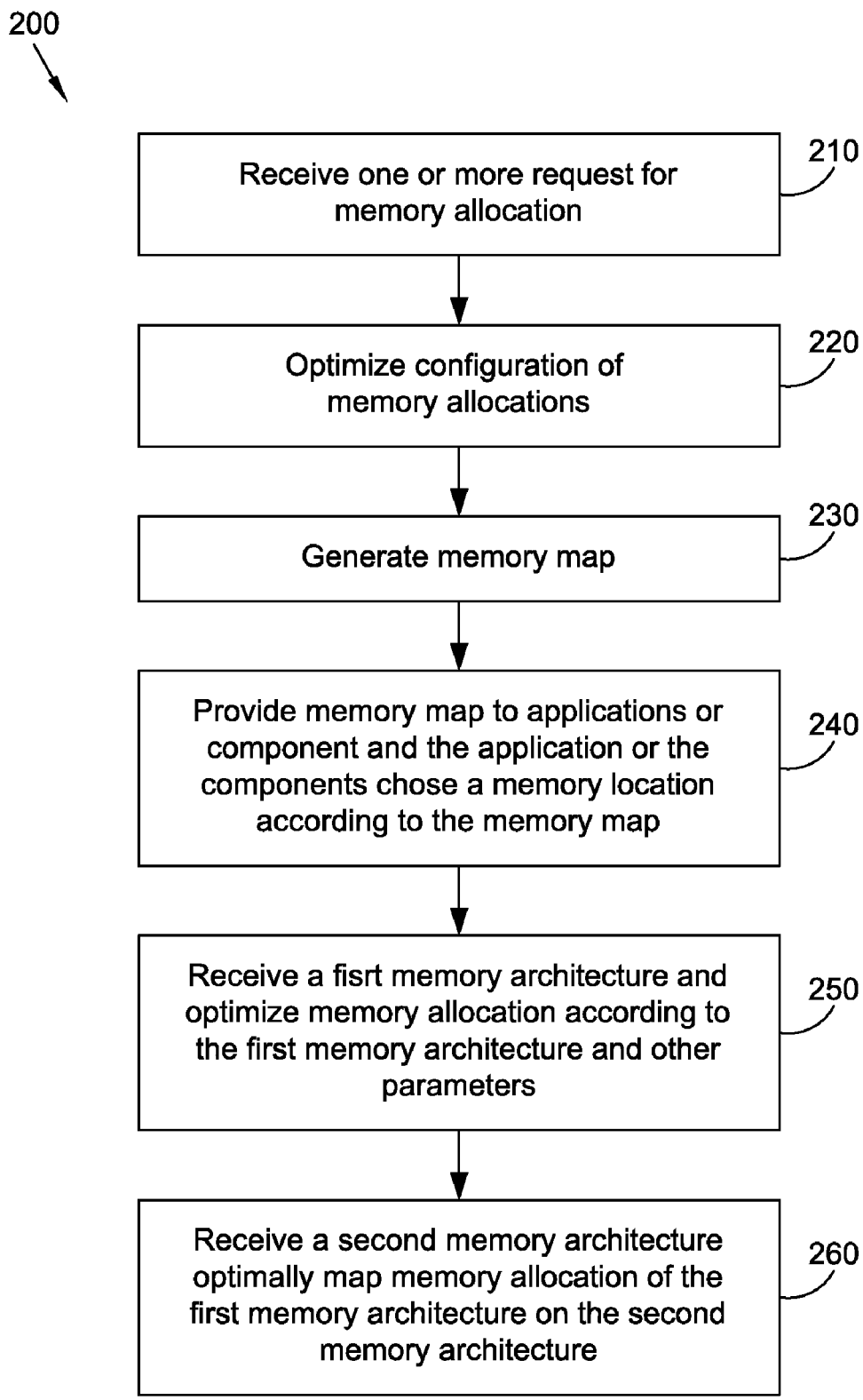
FIG. 2 shows a method of memory allocation management according to an embodiment of the present subject matter.

The foregoing description describes example methods of managing memory. However, it should be noted that the steps explained hereinafter need not necessarily be performed in the order in which they are described. FIG. 2 shows a method 200 for memory allocation management in a system according to an embodiment. The system being configured for running one or more applications. Each of the applications including one or more components. Each of the components being configured for providing one or more requests for memory allocations. The method 200 may include a step 210 of receiving one or more requests for memory allocation from one or more components of one or more applications of the system. Each of the requests includes one or more parameters for indicating details of the request. At step 220, optimization of configuration of memory allocations according to the received requests is performed. The optimization of configuration of memory allocation may be performed according to the one or more parameters. At step 230, a memory map is generated. The memory map may be indicative of configuration of memory allocations. At step 240, the memory map may be obtained by the respective application or component that generated the request. At step 240, the memory map is provided to the applications or components. The applications or components may choose a memory location according to the memory map and convey the selection back to the memory manager. At step 250, a first memory architecture is received. The first memory architecture may be provided by the system or one of the applications or components. Based on the first memory architecture and corresponding parameters, an optimized memory allocations can be constructed. A second memory architecture may be received at step 260 of method 200. The second memory architecture may be provided when new requirements are known and the memory allocation based on the first memory architecture may be optimally transferred onto the second memory architecture.

Figure 3:
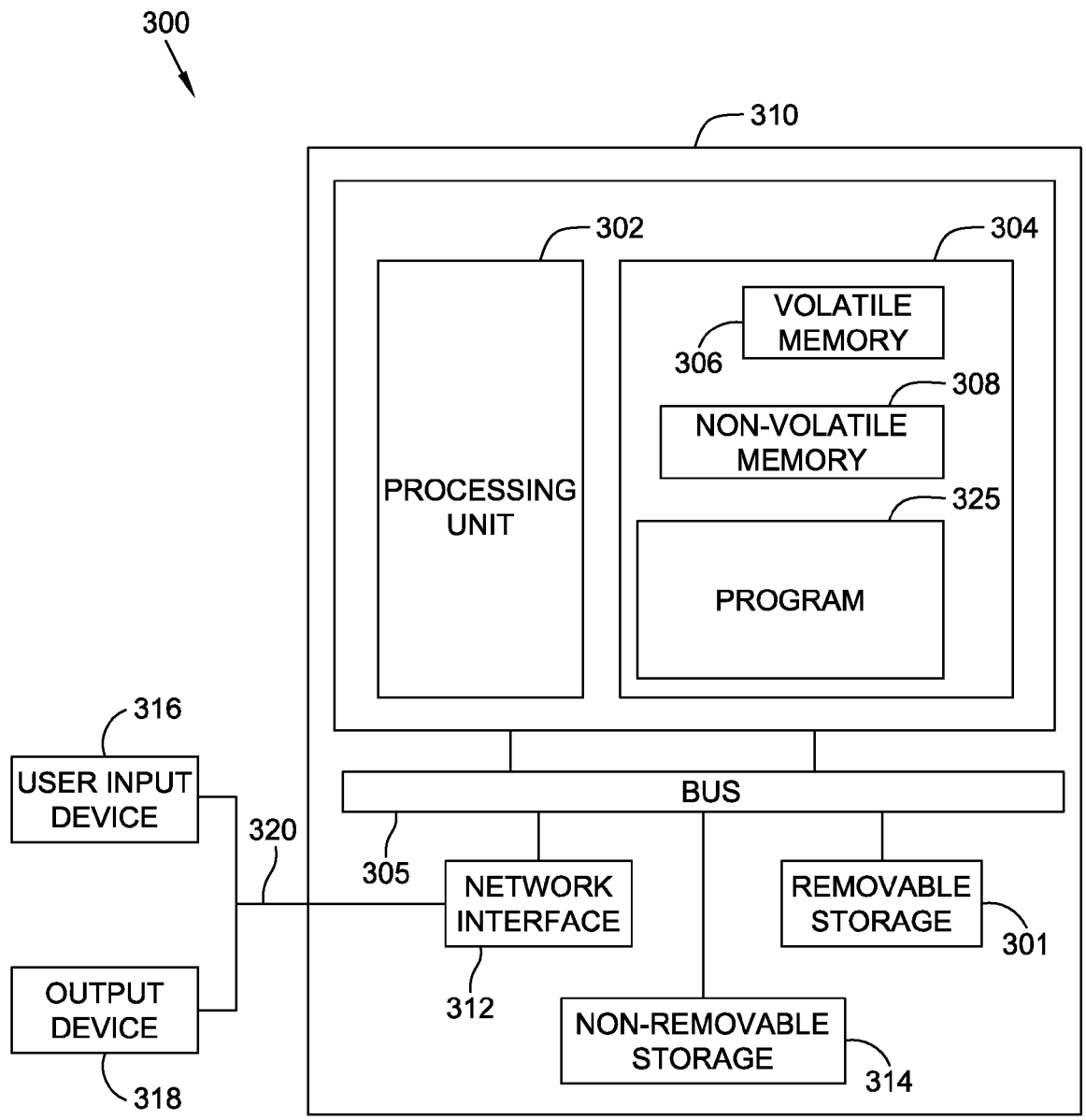
FIG. 3 shows an example of a suitable computing system environment for implementing embodiments of the present subject matter.

An example of a suitable computing system environment for implementing embodiments of the present subject matter is shown in FIG. 3. The FIG. 3 shows the computing system in the form of a computer 310, which may include a processor 302, memory 304, removable storage 301, and non-removable storage 314. Computer 310 additionally includes a bus 305 and a network interface 312.

Computer 310 may include or have access to a computing environment that includes one or more user input devices 316, one or more output devices 318, and one or more communication connections 320 such as a network interface card or a USB connection. The one or more output devices 318 can be a display device of computer, computer monitor, TV screen, plasma display, LCD display, display on a digitizer, display on an electronic tablet, and the like. The computer 310 may operate in a networked environment using the communication connection 320 to connect to one or more remote computers. A remote computer may include a personal computer, server, router, network PC, a peer device or other network node, and/or the like. The communication connection may include a Local Area Network (LAN), a Wide Area Network (WAN), and/or other networks.

The memory 304 may include volatile memory 306 and non-volatile memory 308. A variety of computer-readable media may be stored in and accessed from the memory elements of computer 310, such as volatile memory 306 and non-volatile memory 308, removable storage 301 and non-removable storage 314. Computer memory elements can include any suitable memory device(s) for storing data and machine-readable instructions, such as read only memory (ROM), random access memory (RAM), erasable programmable read only memory (EPROM), electrically erasable programmable read only memory (EEPROM), hard drive, removable media drive for handling compact disks (CDs), digital video disks (DVDs), diskettes, magnetic tape cartridges, memory cards, Memory Sticks™, and the like; chemical storage; biological storage; and other types of data storage.

"Processor" or "processing unit," as used herein, means any type of computational circuit, such as, but not limited to, a microprocessor, a microcontroller, a complex instruction set computing (CISC) microprocessor, a reduced instruction set computing (RISC) microprocessor, a very long instruction word (VLIW) microprocessor, explicitly parallel instruction computing (EPIC) microprocessor, a graphics processor, a digital signal processor, or any other type of processor or processing circuit. The term also includes embedded controllers, such as generic or programmable logic devices or arrays, application specific integrated circuits, single-chip computers, smart cards, and the like.

Embodiments of the present subject matter may be implemented in conjunction with program modules, including functions, procedures, data structures, application programs, etc., for performing tasks, or defining abstract data types or low-level hardware contexts.

Machine-readable instructions stored on any of the above-mentioned storage media are executable by the processing unit 302 of the computer 310. For example, a program module 325 may include machine-readable instructions capable performing step according to above discussion. In one embodiment, the program module 325 may be included on a CD-ROM and loaded from the CD-ROM to a hard drive in non-volatile memory 308. The machine-readable instructions cause the computer 310 to encode according to the various embodiments of the present subject matter. The subject matter further teaches a computer readable medium that includes instructions for performing steps according to the present subject matter. The subject matter further provides an article that includes the computer readable medium according to present subject matter. The subject matter further teaches an article that includes the memory manager and an article that includes the system as described above.

Hence, it may be understood that a memory manager for a system, a system that includes the memory manager and a method of using thereof, are provided. The system may have been configured for running one or more applications. Each of the applications may include one or more components. Each of the components may have been configured for providing one of more requests for memory allocations. The memory manager comprises a first unit configured for receiving one or more requests for memory allocation from one or more components of one or more applications of the system. Each of the requests may include one or more parameters for indicating details of the request. The memory manager also includes a second unit configured for optimizing configuration of memory allocations according to the received requests and corresponding parameters, and for generating a memory map, the memory map being indicative of configuration of memory allocations.

The above description is intended to be illustrative, and not restrictive. Many other embodiments will be apparent to those skilled in the art. The scope of the subject matter should therefore be determined by the appended claims, along with the full scope of equivalents to which such claims are entitled.

As shown herein, the present subject matter can be implemented in a number of different embodiments, including various methods. Other embodiments will be readily apparent to those of ordinary skill in the art. The elements, algorithms, and sequence of operations can all be varied to suit particular requirements. The operations described-above with respect to the method illustrated in FIG. 2 may be performed in a different order from those shown and described herein.

FIGS. 1-3 are merely representational and are not drawn to scale. Certain proportions thereof may be exaggerated, while others may be minimized. FIGS. 1-3 illustrate various embodiments of the subject matter that can be understood and appropriately carried out by those of ordinary skill in the art.

In the foregoing detailed description of the embodiments of the invention, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive invention lies in less than all features of a single disclosed embodiment. Thus, the following claims are hereby incorporated into the detailed description of the embodiments of the invention, with each claim standing on its own as a separate preferred embodiment.

The invention claimed is:

1. A memory manager for allocating memory in an embedded multimedia system, the embedded multimedia system being configured for running one or more applications, each of the one or more applications having one or more components thereof, the memory manager comprising:
   a first unit configured for receiving a plurality of memory allocation requests from the one or more components associated with each of the one or more applications, wherein the plurality of memory allocation requests includes parameters for indicating details of memory allocation requirements of each of the plurality of memory allocation requests; and
   a second unit configured for:
      optimizing configuration of memory allocations for the plurality of memory allocation requests based on the parameters associated with each of the plurality of memory allocation requests;
      generating a memory map based on the optimized configuration of memory allocations, wherein the memory map being indicative of the configuration of memory allocations;

providing the memory map to each of the one or more applications; and allocating the memory in the system according to the memory map if the memory map is acceptable by each of the one or more applications, wherein the first unit is further configured for receiving a first memory architecture from the one or more applications and the second unit optimizes the configuration of memory allocations according to the parameters of the plurality of memory allocation requests and the first memory architecture if the memory map is not acceptable by anyone of the one or more applications.

2. The memory manager of claim 1, wherein the second unit generates a memory map based on the result of the optimization.

3. The memory manager of claim 1, wherein the second is configured for repeating the steps of optimizing, generating, providing and allocating until an optimized configuration that is acceptable by each of the one or more applications is reached.

4. The memory manager of claim 1, wherein each of the one or more applications comprises an IP video phone application.

5. The memory manager of claim 1, wherein each of the one or more components is selected from the group consisting of a H.264 decoder, a H.264 encoder, a G.711 speech codec, MPEG4 encoder/decoder, and a Advanced Audio Codec (AAC).

6. The memory manager of claim 1, wherein the one or more applications alter the parameters associated with their memory allocation requests based on the memory map, and wherein the first memory architecture comprises layout information of the memory with the altered parameters.

7. The memory manager of claim 1, wherein the second unit optimizes the configuration of memory allocations by examining the parameters.

8. The memory manager of claim 1, wherein the memory map is accessible by the components wherein a new memory allocation request is generated with a parameter indicating a desired memory location based on the information contained in the memory map.

9. The memory manager of claim 1, wherein the memory comprises a plurality of auxiliary memories, each of the plurality of auxiliary memories being characterized by operating speeds, capacities and suitability of application types.

10. The memory manager as claimed in claim 9, wherein the parameters comprise at least one of:
a first parameter for indicating a desired auxiliary memory;
a second parameter for indicating priority of the memory allocation request;
a third parameter for indicating memory alignment of the memory allocation request;
a fourth parameter for indicating memory size required; and
a fifth parameter for indicating mandatory status of the memory allocation request.

11. The memory manager of claim 9, wherein each of the plurality of auxiliary memories being one of a component memory, a heap memory or a combination thereof.

12. The memory manager of claim 11, wherein the component memory being one of a scratch memory, a persistent memory or a combination thereof.

13. A method for managing memory in an embedded multimedia system, the embedded multimedia system being configured for running one or more applications, each of the one or more applications having one or more components thereof, the method comprising:
receiving a plurality of memory allocation requests for memory allocation from the one or more components associated with each of the one or more applications, wherein the plurality of memory allocation requests includes one or more parameters for indicating details of memory allocation requirements of each of the plurality of memory allocation requests;
optimizing configuration of memory allocation for the plurality of memory allocation requests based on the one or more parameters associated with each of the plurality of memory allocation requests;
generating a memory map based on the optimized configuration of memory allocations, wherein the memory map being indicative of the configuration of memory allocations;
providing the memory map to each of the one or more applications;
if the memory map is acceptable by each of the one or more applications allocating the memory in the system according to the memory map;
if the memory map is not acceptable by anyone of the one or more applications, receiving a first memory architecture from the one or more applications for optimizing memory allocation, wherein the one or more applications alter the one or more parameters associated with their memory allocation requests based on the memory map, and wherein the first memory architecture includes information of a layout of the memory with the altered parameters; and
optimizing the configuration of memory allocations according to the parameters of the plurality of memory allocation requests and the first memory architecture.

14. The method of claim 13, wherein the method includes the step of generating a memory map based on the result of the optimization, and selectively opting for allocating memory according to the memory map on the first memory architecture.

15. The method of claim 13 further comprising repeating the steps of optimizing, generating, providing and allocating until an optimized configuration that is acceptable by each of the one or more applications is reached.

16. The method of claim 13, wherein optimizing the memory allocation comprises examining the one or more parameters for generating the memory map.

17. The method of claim 13 further comprising selectively allocating memory locations based on the information in the memory map.

18. A computer system comprising:
a processing unit; and
a memory coupled to the processor, the memory having stored therein a code for performing the method of claim 13.

19. A non transitory computer-readable storage medium operable with a computer system, the computer-readable medium having stored thereon instructions operable with an architectural simulator environment supported by the computer system, the medium comprising instructions for performing the steps of claim 13.

20. A system comprising a memory manager of claim 1.

* * * * *